(12) United States Patent
Weiss et al.

(10) Patent No.: US 12,095,808 B1
(45) Date of Patent: Sep. 17, 2024

(54) SYSTEM AND METHOD FOR NEAR-REAL TIME CLOUD SECURITY POSTURE MANAGEMENT

(71) Applicant: Wiz, Inc., New York, NY (US)

(72) Inventors: Alon Weiss, Tel Aviv (IL); Itamar Azulay, Tel Aviv (IL); Tom Lev Ran, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/603,931

(22) Filed: Mar. 13, 2024

(51) Int. Cl.
*H04L 9/40* (2022.01)

(52) U.S. Cl.
CPC .................. *H04L 63/1441* (2013.01)

(58) Field of Classification Search
CPC ............. H04L 63/1416; H04L 63/1425; H04L 63/1408; H04L 63/1441; H04L 63/145; H04L 63/0236; H04L 63/1466; H04L 51/212; G06F 21/552; G06F 21/55; H04W 12/02; H04W 12/12
See application file for complete search history.

(56) References Cited

U.S. PATENT DOCUMENTS

| | | | |
|---|---|---|---|
| 9,386,034 B2 | 7/2016 | Cochenour | |
| 11,956,264 B2 * | 4/2024 | Yun | H04L 63/1425 |
| 2012/0023221 A1 * | 1/2012 | Dayan | G06F 11/3055 709/224 |
| 2012/0210158 A1 * | 8/2012 | Akiyama | G06F 21/554 714/2 |
| 2015/0347751 A1 | 12/2015 | Card et al. | |
| 2018/0343281 A1 * | 11/2018 | Ahuja | H04L 63/1425 |
| 2019/0268361 A1 * | 8/2019 | Blewett | G06F 21/57 |
| 2022/0350675 A1 | 11/2022 | Navali et al. | |
| 2022/0368716 A1 | 11/2022 | Shake et al. | |

* cited by examiner

*Primary Examiner* — Ali S Abyaneh
(74) *Attorney, Agent, or Firm* — M&B IP Analysts, LLC

(57) ABSTRACT

A system and method for near-real time inspection of a computing environment for a cybersecurity object is presented. The method includes: continuously receiving a plurality of event records, each event record having an event type, and corresponding to an event in the computing environment; detecting in the plurality of event records, an event record of a first type; parsing the event record of the first type to detect a resource identifier, wherein the resource identifier corresponds to a resource deployed in the computing environment; initiating inspection of the resource for a cybersecurity object; and initiating a mitigation action in the computing environment, in response to detecting the cybersecurity object on the resource.

15 Claims, 4 Drawing Sheets

SYSTEM AND METHOD FOR NEAR-REAL TIME CLOUD SECURITY POSTURE MANAGEMENT

TECHNICAL FIELD

The present disclosure relates generally to cloud security posture management (CSPM), and specifically to providing near-real time CSPM monitoring solutions.

BACKGROUND

Cloud Security Posture Management (CSPM) is a crucial component in the realm of cloud computing, serving as a comprehensive solution for organizations to enhance and maintain the security of their cloud environments. In essence, CSPM refers to a set of security practices and tools designed to proactively identify, assess, and remediate security risks within cloud infrastructure. As businesses increasingly migrate their operations to cloud platforms, the need for robust security measures becomes paramount, and CSPM emerges as a strategic ally in achieving this objective.

At its core, CSPM addresses the unique challenges associated with cloud security by focusing on the configuration and management of cloud resources. Cloud environments, characterized by their dynamic and scalable nature, require specialized security measures to safeguard sensitive data, applications, and infrastructure. CSPM provides a unified framework for continuous monitoring and enforcement of security policies across diverse cloud service providers, ensuring a consistent and reliable defense against potential threats.

One key aspect of CSPM is the ability to assess the configuration settings of cloud resources. This involves scrutinizing parameters such as access controls, encryption settings, network configurations, and other relevant settings that impact the overall security posture. By identifying misconfigurations or deviations from best practices, CSPM enables organizations to preemptively detect vulnerabilities that could be exploited by malicious actors. This proactive approach helps in reducing the attack surface and fortifying the cloud infrastructure against potential breaches.

Furthermore, CSPM facilitates compliance management by aligning cloud configurations with industry-specific regulatory requirements and internal security policies. This is particularly significant for organizations operating in sectors with stringent compliance standards, such as finance or healthcare. The automated assessment and reporting capabilities of CSPM streamline the compliance process, providing organizations with the necessary insights to address any non-compliance issues promptly.

Another critical function of CSPM is continuous monitoring. Cloud environments are dynamic, with resources being added, modified, or decommissioned regularly. CSPM ensures real-time visibility into these changes, allowing organizations to promptly detect and respond to any security incidents or deviations from established security baselines. This constant vigilance is essential in the fast-paced and ever-evolving landscape of cloud computing.

CSPM tools often offer remediation capabilities, allowing organizations to automate the correction of identified security issues. This not only expedites the response to potential threats but also minimizes the likelihood of human error in the remediation process. Automation is a key feature in enhancing the overall efficiency and efficacy of security operations within a cloud environment.

Due to the size of most cloud environments, continuously scanning an environment for cybersecurity risks is infeasible, for example due to the cost in terms of money and resources needed to be allocated to doing so. Current solutions therefore favor periodically scanning the environment, which leaves the environment potentially somewhat exposed in between scans.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include continuously receiving a plurality of event records, each event record having an event type, and corresponding to an event in the computing environment. Method may also include detecting in the plurality of event records, an event record of a first type. Method may furthermore include parsing the event record of the first type to detect a resource identifier, where the resource identifier corresponds to a resource deployed in the computing environment. Method may in addition include initiating inspection of the resource for a cybersecurity object. Method may moreover include initiating a mitigation action in the computing environment, in response to detecting the cybersecurity object on the resource. Other embodiments of this aspect include corresponding computer systems, apparatus, and computer programs recorded on one or more computer storage devices, each configured to perform the actions of the methods.

Implementations may include one or more of the following features. Method may include: periodically inspecting each resource of a plurality of resources deployed in the computing environment for the cybersecurity object, based on a list of resource identifiers. Method may include: determining that the resource corresponding to the resource identifier was not inspected in a previous inspection period. Method may include: initiating inspection of the resource further based on a determination that the resource was not previously inspected. Method may include: adding the resource identifier to the list of resource identifiers. Method may include: initiating inspection of a second resource in response to detecting the cybersecurity object on the resource, where the event record includes an identifier of the second resource. Method may include: continuously receiving event records from a first source; and periodically receiving event records from a second source. Method may include: detecting in the plurality of event records an event record of a second type; and initiating inspection of the resource only in response to detecting that the event record of the second type occurred after the event record of the first type. Method may include: initiating inspection of the resource for a second cybersecurity object; and determining that the resource includes a cybersecurity risk, based on detecting the cybersecurity object and the second cybersecurity object. Implementations of the described techniques may include hardware, a method or process, or a computer tangible medium.

In one general aspect, non-transitory computer-readable medium may include one or more instructions that, when executed by one or more processors of a device, cause the device to: continuously receive a plurality of event records, each event record having an event type, and corresponding to an event in the computing environment; detect in the plurality of event records, an event record of a first type; parse the event record of the first type to detect a resource identifier, where the resource identifier corresponds to a resource deployed in the computing environment; initiate inspection of the resource for a cybersecurity object; and initiate a mitigation action in the computing environment, in response to detecting the cybersecurity object on the resource. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: continuously receive a plurality of event records, each event record having an event type, and corresponding to an event in the computing environment. System may in addition detect in the plurality of event records, an event record of a first type. System may moreover parse the event record of the first type to detect a resource identifier, where the resource identifier corresponds to a resource deployed in the computing environment. System may also initiate inspection of the resource for a cybersecurity object. System may furthermore include initiate a mitigation action in the computing environment, in response to detecting the cybersecurity object on the resource. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: periodically inspect each resource of a plurality of resources deployed in the computing environment for the cybersecurity object, based on a list of resource identifiers. System where the memory contains further instructions which when executed by the processing circuitry further configure the system to: determine that the resource corresponding to the resource identifier was not inspected in a previous inspection period. System where the memory contains further instructions which when executed by the processing circuitry further configure the system to: initiate inspection of the resource further based on a determination that the resource was not previously inspected. System where the memory contains further instructions which when executed by the processing circuitry further configure the system to: add the resource identifier to the list of resource identifiers. System where the memory contains further instructions which when executed by the processing circuitry further configure the system to: initiate inspection of a second resource in response to detecting the cybersecurity object on the resource, where the event record includes an identifier of the second resource. System where the memory contains further instructions which when executed by the processing circuitry further configure the system to: continuously receive event records from a first source; and periodically receive event records from a second source. System where the memory contains further instructions which when executed by the processing circuitry further configure the system to: detect in the plurality of event records an event record of a second type; and initiate inspection of the resource only in response to detecting that the event record of the second type occurred after the event record of the first type. System where the memory contains further instructions which when executed by the processing circuitry further configure the system to: initiate inspection of the resource for a second cybersecurity object; and determine that the resource includes a cybersecurity risk, based on detecting the cybersecurity object and the second cybersecurity object. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
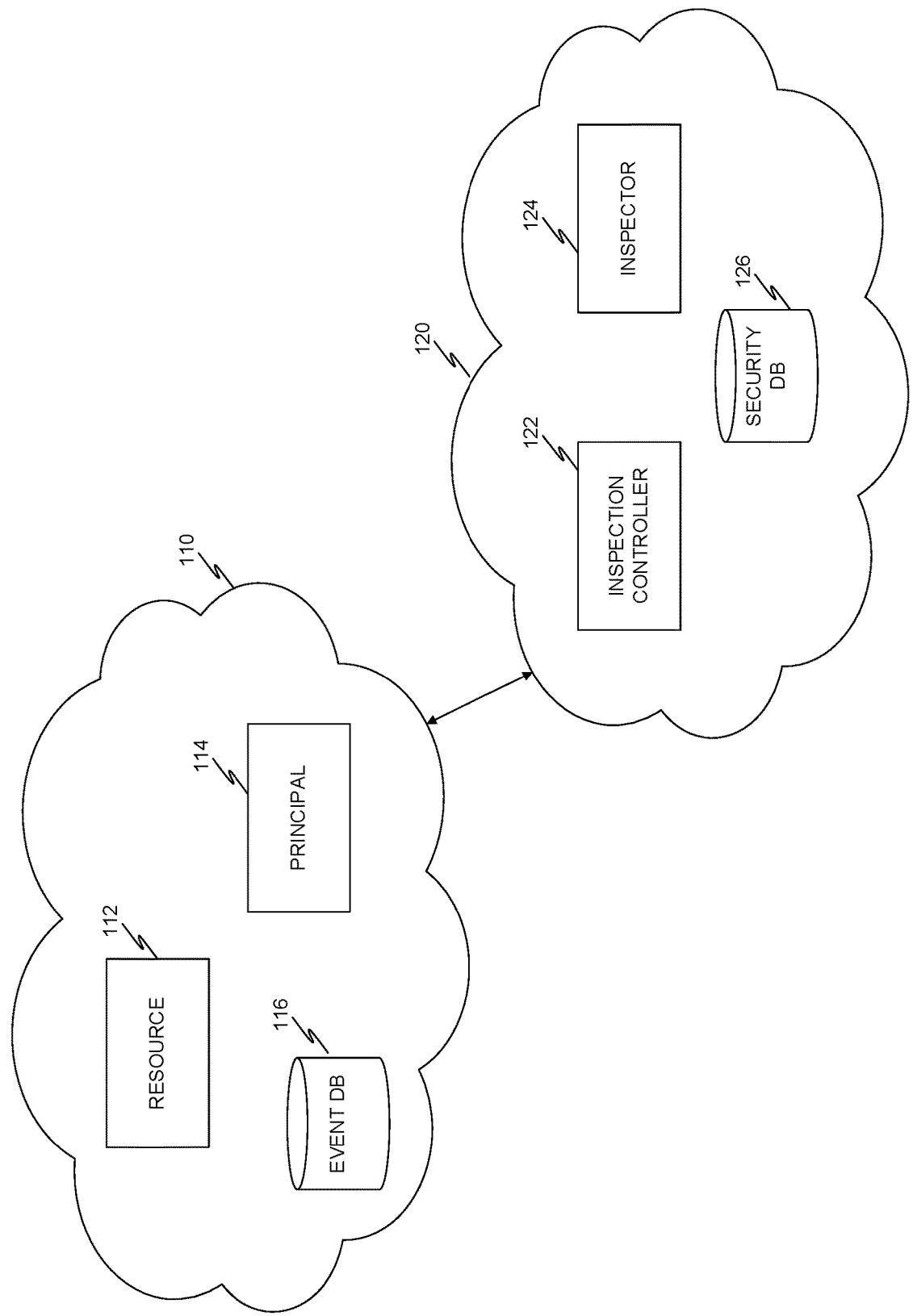
FIG. 1 is an example schematic illustration of a computing environment monitored by an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a computing environment monitored by an inspection environment, utilized to describe an embodiment. According to an embodiment, a computing environment 110 includes a plurality of entities. In an embodiment, the computing environment 110 is a cloud computing environment, a networked computing environment, an on-prem environment, a hybrid environment, a combination thereof, and the like.

In some embodiments, the computing environment 110 includes a virtual private cloud (VPC), a virtual network (VNet), a virtual private network (VPN), a subnet, a combination thereof, and the like. For example, according to an embodiment, a computing environment 110 is deployed on a cloud computing infrastructure. In an embodiment, a cloud computing infrastructure is, for example, Amazon® Web Services (AWS), Microsoft® Azure, Google® Cloud Platform (GCP), and the like.

In an embodiment, the computing environment 110 includes a plurality of entities, such as resources and principals. For example, in an embodiment, a resource 112 is deployed in the computing environment 110. In certain embodiments, a resource 112 is an entity which exposes a functionality, provides a service, a software, a hardware resource, a virtual resource, a combination thereof, and the like.

For example, according to an embodiment, a resource 112 is a virtual machine, a software container, a serverless function, a combination thereof, and the like. In some embodiments, the resource 112 is an application, an operating system, a file, a software binary, a software library, a combination thereof, and the like.

In an embodiment, a virtual machine is implemented utilizing Oracle® VirtualBox, a software container is implemented utilizing Kubernetes® platform, and a serverless function is implemented utilizing Amazon® Lambda.

In some embodiments, the computing environment 110 further includes a plurality of principals, such as principal 114. In an embodiment, a principal is an entity, such as a cloud entity, which is authorized to initiate actions in the computing environment 110. For example, in an embodiment, a principal 114 is a user account, a service account, a user role, a user group, a local account, a system account, a network account, a combination thereof, and the like.

In certain embodiments, the computing environment 110 includes, or is otherwise communicatively coupled with, an identity and access management (IAM) server (not shown). In some embodiments, the IAM server is configured to store principals and corresponding credentials (e.g., username and password), policies, access policies, and the like.

In an embodiment, the computing environment 110 further includes an event database 116. In some embodiments, the event database is implemented for example as Amazon CloudTrail. In an embodiment, a resource, such as a serverless function, is configured to write events as data records into a shared resource, such as a storage bucket.

According to an embodiment, an event database 116 is configured to store therein events as data records of activity in the computing environment 110.

For example, in an embodiment, an event is provisioning a resource, generating a new principal, deprovisioning a resource, updating a permission of a resource, communication between two resources, access of a resource by a principal, a combination thereof, and the like.

In some embodiments, an event data record includes a plurality of data fields, each having a data value. In certain embodiments, a data record is stored as a vector, each place in the vector corresponding to a unique data field. For example, according to an embodiment, a data field indicates a host name, a source, a destination, a principal identifier, a username identifier, various combinations thereof, and the like.

In an embodiment, the computing environment 110 is monitored by an inspection environment 120. In certain embodiments, the inspection environment 120 is configured to monitor the computing environment 110 for cybersecurity threats, cybersecurity risks, misconfigurations, vulnerabilities, exposures, combinations thereof, and the like.

In some embodiments, the inspection environment 120 includes an inspection controller 122, an inspector 124, and a security database 126. In an embodiment, the inspection controller 122 is configured to initiate inspection of resources in the computing environment 110.

For example, in some embodiments, the inspection controller 122 is configured to select a resource 112 of the computing environment 110, and provision an inspector 124 to inspect the resource 112 for a cybersecurity object, wherein the cybersecurity object indicates a cybersecurity risk, a cybersecurity threat, a misconfiguration, a vulnerability, an exposure, a malware object, a combination thereof, and the like.

In an embodiment, the inspection controller 122 is configured to generate a copy, a snapshot, a clone, and the like, of a disk deployed in the computing environment 110. In some embodiments, it is advantageous to generate a clone of a disk for cybersecurity inspection, as a clone is available immediately upon initiating the clone, whereas in generating a snapshot, the snapshot is available only once the entire snapshot file is created. Furthermore, according to an embodiment, a clone does not create a copy, but is rather a pointer address which points to the same underlying data as the original disk (from which the cloned disk is generated).

In an embodiment, a cybersecurity object includes: a file, a folder, a system directory, an operating system, an application, a software library, a software binary, a code object, a malware code, a hash of a file, a checksum of a file, a password, a user account, a certificate, a cryptographic key, a combination thereof, and the like.

In certain embodiments, the inspection controller 122 is configured to provision an inspector 124 to inspect the copy, snapshot, clone, and the like, for the cybersecurity object. In some embodiments, an inspector 124 is configured to detect a cybersecurity object of a first type, and a cybersecurity object of a second type. In an embodiment, the inspection controller is configured to detect a cybersecurity risk based on a combination of cybersecurity objects (e.g., a toxic combination).

According to an embodiment, a security database 126 is configured to store a representation of computing environments, such as the computing environment 110. In an embodiment, the security database 126 includes a database schema, including a database constraint, metadata, and the like, which define how data records are generated and stored in the security database 126.

In some embodiments, the security database 126 is configured to utilize a unified schema, such that resources, for example, from various different cloud computing environments (e.g., Azure and AWS) are all represented using a single data record type (e.g., 'resource' type).

As an example, a virtual machine in Azure and a virtual machine in AWS are represented in the security database 126 utilizing a single representation type which is utilized to represent any virtual machine, according to an embodiment.

In certain embodiments, the security database 126 is further configured to represent cybersecurity risks, cybersecurity threats, network paths, exposures, misconfigurations, remediation actions, mitigation actions, enrichments, combinations thereof, and the like.

For example, in an embodiment, the security database 126 is a graph database, such as Neo4j®. In such an embodiment, a resource is represented as a node in a security graph. In an embodiment, a node is connected to another node utilizing a vertex, wherein the vertex is further utilized to represent a type of connection between the nodes. For example, in an embodiment, a node representing a principal is connected via a vertex to a node representing a resource, wherein the vertex indicates that the principal 'can access' the resource.

In some embodiments, the inspection controller 122 is configured to periodically inspect the computing environment 110 for cybersecurity risks, threats, etc. A complete cybersecurity inspection is time- and resource-consuming, therefore a tradeoff is to perform such inspection periodically.

However, in a computing environment, such as a cloud computing environment, where resources are provisioned and de-provisioned rapidly, a resource might only be provisioned in between inspections, and would therefore never get inspected.

Additionally, a bad actor knowing when inspection occurs could configure a resource to deprovision during inspection, and then provision the resource again once the inspection window is complete, allowing them to utilize resources in the computing environment 110 for nefarious purposes.

In an embodiment, it is therefore advantageous to have an inspection controller 122 which is further configured to detect certain events, for example by accessing the event database 116, a cloud log of the computing environment 110, a network log of the computing environment 110, a combination thereof, and the like, to detect a resource which was not inspected at the last inspection.

For example, in an embodiment, an inspection controller 122 is configured to maintain a list of identifiers of resources in the computing environment 110 which were last inspected, a list of identifiers of resources in the computing environment 110 which should be inspected in the next inspection, a combination thereof, and the like.

In an embodiment, the inspection controller 122 is configured to detect certain predetermined event types, for example in the event database 116, and initiate inspection of a resource based on a detected event. For example, in an embodiment, the inspection controller 122 is configured to detect an event type indicating that a resource is provisioned. In an embodiment, in response to detecting the event in the event database 116, the inspection controller 122 is configured to initiate inspection of the provisioned resource. In certain embodiments, the inspection controller 122 is configured to extract an identifier of the resource from the event record, and further initiate inspection based on the identifier of the resource.

In certain embodiments, the inspection controller 122 is configured to compare a detected resource identifier to a list of resources of the inspection controller 122. In an embodiment, where the resource identifier is not on the list of resources, the inspection controller 122 is configured to initiate inspection for the resource. In some embodiments, the inspection controller 122 is configured to add the resource identifier to the list of resources. This allows, according to an embodiment, the inspection controller 122 to provision an inspector for the resource at following inspections of the computing environment 110.

In some embodiments, the inspection controller 122 is configured to immediately provision an inspector 124 to inspect a resource based on a detected event. This provides for real-time, or near-real time inspection of the resource for a cybersecurity object which indicates, for example, a cybersecurity risk.

Figure 2:
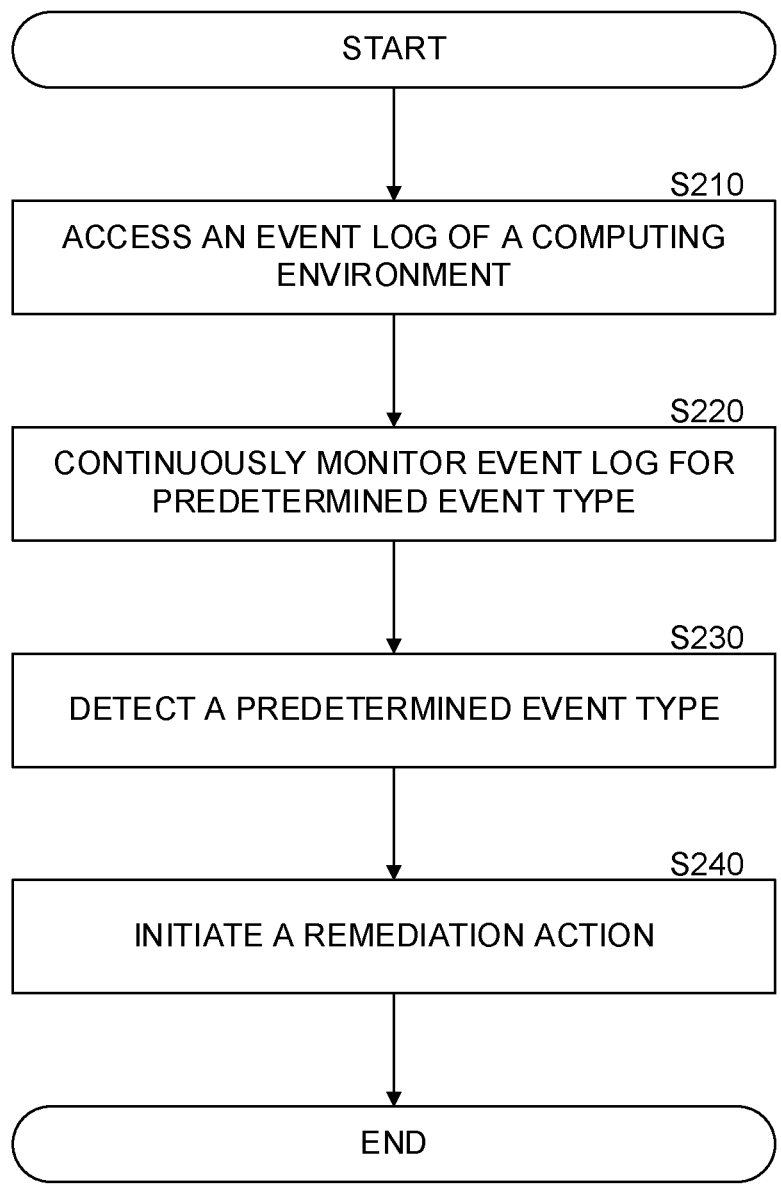
FIG. 2 is an example flowchart of a method for detecting events in a computing environment, implemented in accordance with an embodiment.

FIG. 2 is an example flowchart of a method for detecting events in a computing environment, implemented in accordance with an embodiment. According to an embodiment, it is advantageous to perform real-time, or near-real time, inspection of a computing environment, and specifically by performing in real-time (or near-real time) inspection of only components of the computing environment which were not previously inspected, considerable resources are saved, as only the new resources are inspected ad-hoc.

At S210, a plurality of event records are accessed. In an embodiment, accessing a plurality of events includes accessing a bucket, a storage, a database, and the like, where event records are stored.

In an embodiment, an event record includes an event type. In some embodiments, an event type indicates: a change in a resource, provisioning of a resource, a change in a permission, a combination thereof, and the like.

In some embodiments, accessing an event record includes accessing a log, such as a network log, a cloud log, an event log, a combination thereof, and the like. In certain embodiments, the event records are stored, for example, utilizing CloudTrail.

At S220, an event type is monitored for. In an embodiment, a plurality of events are received continuously, periodically, a combination thereof, and the like. For example, in some embodiments, a first source provides event records periodically, while a second source provides event records continuously, both sources providing events based on the same computing environment.

In an embodiment, an inspection controller is configured to monitor an event log, an event database, an event store, and the like, for events of a first type. In an embodiment, an event log, for example, includes a plurality of different event types. However, not all events are of interest in terms of initiating a cybersecurity inspection.

In some embodiments, the inspection controller is configured to monitor for a first type of event and a second type of event occurring within a predetermined time window. For example, where a first event indicates a resource is provisioned, and a second event indicates the resource communicated with a blocked IP address, the inspection controller is configured to initiate inspection of the resource.

At S230, a predetermined event type is detected. In an embodiment, first a predetermined event type of a first type is detected at a first time, and a second predetermined event type of a second type is detected at a second time. In some embodiments, detecting event types within a predetermined timeframe indicates that cybersecurity inspection should be initiated.

In some embodiments, detecting a predetermined event type includes receiving an event record, parsing the event record to detect a data field, extracting a value of the data field, comparing the value of the data field to a predetermined data value, and determining if the event is of a predetermined type based on the comparison, the extracted data value, and the like.

At S240, a mitigation action is initiated. In an embodiment, a mitigation action includes: revoking access from a principal, changing access of a principal, revoking access to a resource, revoking access from a resource, initiating a firewall policy, sandboxing a resource, de-provisioning a resource, generating an alert, updating an alert, generating an alert severity, updating an alert severity, a combination thereof, and the like.

In some embodiments, a mitigation action includes a remediation action. For example, where a cybersecurity risk, threat, misconfiguration, and the like, are detected, a remediation action is initiated in order to remediate a risk, threat, etc.

In some embodiments, a mitigation action includes generating an instruction to inspect the resource at a later time.

Figure 3:
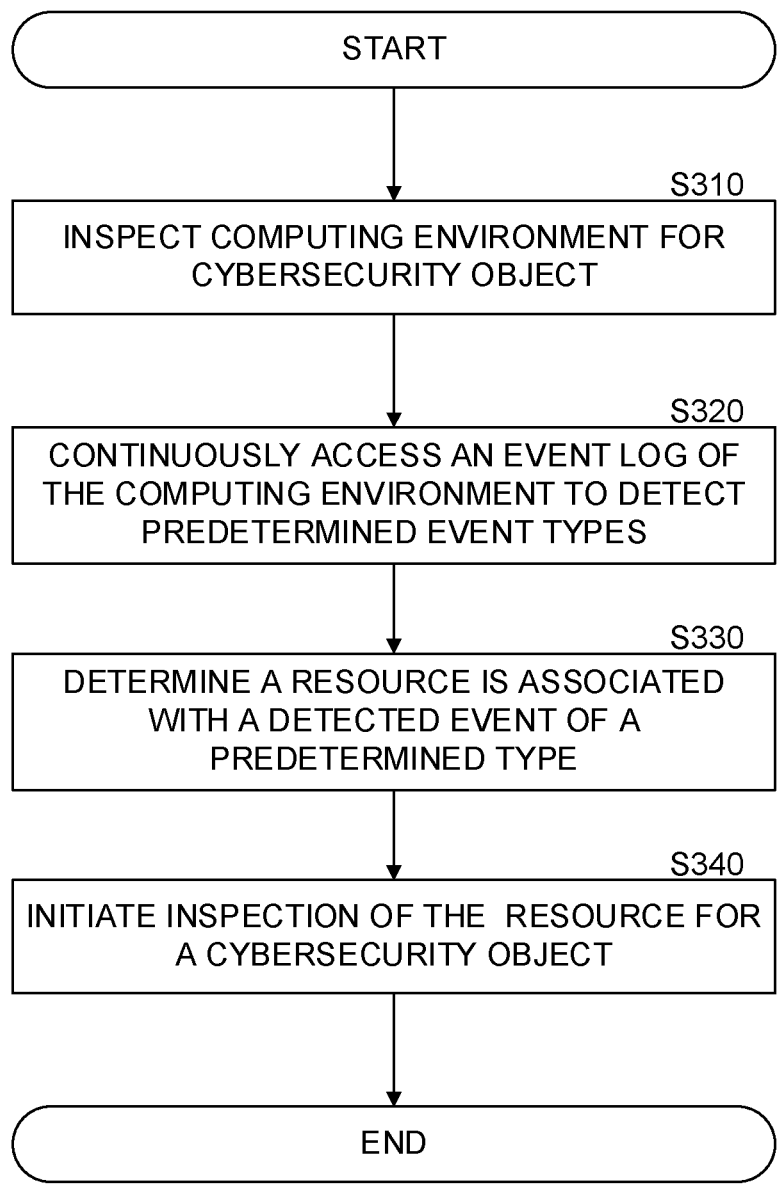
FIG. 3 is an example flowchart of a method for providing near-real time cybersecurity inspection of a computing environment, implemented in accordance with an embodiment.

FIG. 3 is an example flowchart of a method for providing near-real time cybersecurity inspection of a computing environment, implemented in accordance with an embodiment. In an embodiment, providing near-real time cybersecurity inspection includes continuously detecting event records generated in a computing environment in response to events. In some embodiments, certain events are predetermined (e.g., certain event types) to be initiators of cybersecurity inspection, i.e., when an event of such a type is detected, cybersecurity inspection should be initiated for the resource which is associated with the event.

At S310, a computing environment is inspected for a cybersecurity object. In an embodiment, inspection of the computing environment occurs periodically, e.g., every 12 hours, every day, once a week, once a day, etc. In some embodiments, an inspection controller is configured to discover resources in the computing environment, for example by initiating network discovery to detect resources deployed therein. In certain embodiments, an inspection controller is configured to query an API of a cloud computing infrastructure, such as AWS, to detect resources deployed in a particular cloud computing environment.

In an embodiment, the computing environment is inspected for a plurality of cybersecurity objects. In an embodiment, a cybersecurity object includes: a file, a folder, a system directory, an operating system, an application, a software library, a software binary, a code object, a malware code, a hash of a file, a checksum of a file, a password, a user account, a certificate, a cryptographic key, a combination thereof, and the like.

At S320, an event store is accessed. In an embodiment, an event store is an event storage, a storage bucket, a cloud log, a network log, an event log, a combination thereof, and the like.

In certain embodiments, accessing an event store includes providing credentials to a service account, a user account, and the like, to access the event store. For example, in an embodiment, an inspection controller is provided with login credentials, a security token, a certificate, a cryptographic key, and the like, which allow the inspection controller to access an event store.

In some embodiments, the event store is accessed continuously, for example by continuously receiving events from an event source. In an embodiment, the event store is accessed periodically, continuously, and a combination thereof. For example, in an embodiment, the event store is accessed for events periodically between a first time and a second time, and continuously between the second time and a third time. This is advantageous, according to an embodiment, as it allows to throttle network traffic at busier times, by reducing the amount of event records which are accessed when the network is busy.

At S330, a resource identifier is detected. In an embodiment, a resource identifier is detected in an event record of a first type, wherein an inspection controller is configured to trigger inspection in response to detecting an event record of the first type.

In some embodiments, detecting a resource identifier includes detecting, in an event from the accessed event store, an event record of a first type, and parsing the event record to detect a value of a predetermined data field, wherein the predetermined data field indicates an identifier of a resource. For example, in an embodiment, a data record is parsed to detect a data field 'resouce_name'. In the example, the data field 'resource_name' includes an identifier 'host.domain.123-4'.

In certain embodiments, an event record includes a plurality of resource identifiers. In some embodiments, the plurality of resource identifiers are all associated with a single resource, for example container pods all associated with a single container node, or a plurality of container nodes all associated with a container cluster.

At S340, inspection is initiated for a resource. In an embodiment, an inspection controller is configured to initiate inspection of a resource based on the detected resource identifier.

In an embodiment, where a plurality of resource identifiers are detected, the inspection controller is configured to initiate inspection for any, or all, of the resources corresponding to the resource identifier. In some embodiments, where a plurality of resources are detected, inspection is initiated for a resource based on the event type. For example, where an event indicates that resource 'A' accessed resource 'B', the inspection controller is configured to initiate inspection for resource 'A' only. In an embodiment, in response to detecting a cybersecurity object on resource 'A', the inspection controller is configured to initiated inspection on resource 'B' for the cybersecurity object, to determine, for example, if resource 'B' was infected via resource 'A'.

Figure 4:
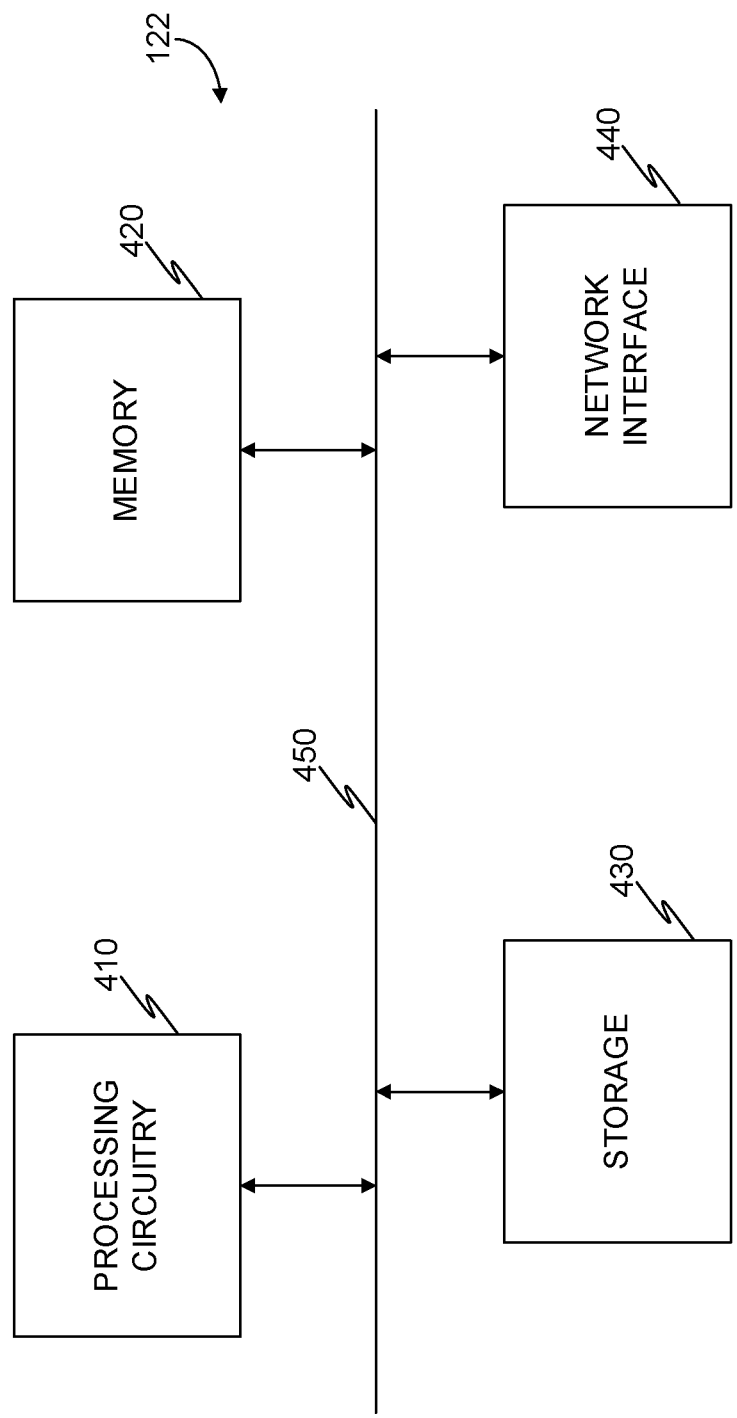
FIG. 4 is an example schematic diagram of an inspection controller according to an embodiment.

FIG. 4 is an example schematic diagram of an inspection controller 122 according to an embodiment. The inspection controller 122 includes, according to an embodiment, a processing circuitry 410 coupled to a memory 420, a storage 430, and a network interface 440. In an embodiment, the components of the inspection controller 122 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspection controller 122 with communication with, for example, the inspector 124, the computing environment 110, and the security database 126, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the inspector 124, the security database 126, a combination thereof, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for near-real time inspection of a computing environment for a cybersecurity object, comprising:
   continuously receiving from a first source a first plurality of event records, each event record having an event type, and corresponding to an event in the computing environment;
   periodically receiving from a second source a second plurality of event records, each event record having an event type, and corresponding to an event in the computing environment;
   detecting an event record of a first type;
   detecting an event record of a second type;
   determining that the event record of the second type occurring after the event record of the first type;
   parsing the event record of the first type to detect a resource identifier, wherein the resource identifier corresponds to a resource deployed in the computing environment;
   initiating inspection of the resource for a cybersecurity object only in response to detecting that the event record of the second type occurred after the event record of the first type; and
   initiating a mitigation action in the computing environment, in response to detecting the cybersecurity object on the resource.

2. The method of claim 1, further comprising:
   periodically inspecting each resource of a plurality of resources deployed in the computing environment for the cybersecurity object, based on a list of resource identifiers.

3. The method of claim 2, further comprising:
   determining that the resource corresponding to the resource identifier was not inspected in a previous inspection period.

4. The method of claim 3, further comprising:
   initiating inspection of the resource further based on a determination that the resource was not previously inspected.

5. The method of claim 2, further comprising:
   adding the resource identifier to the list of resource identifiers.

6. The method of claim 1, further comprising:
   initiating inspection of a second resource in response to detecting the cybersecurity object on the resource, wherein the event record of the first type includes an identifier of the second resource.

7. The method of claim 1, further comprising:
   initiating inspection of the resource for a second cybersecurity object; and
   determining that the resource includes a cybersecurity risk, based on detecting the cybersecurity object and the second cybersecurity object.

8. A non-transitory computer-readable medium storing a set of instructions for near-real time inspection of a computing environment for a cybersecurity object, the set of instructions comprising:
one or more instructions that, when executed by one or more processors of a device, cause the device to:
continuously receiving from a first source a first plurality of event records, each event record having an event type, and corresponding to an event in the computing environment;
periodically receiving from a second source a second plurality of event records, each event record having an event type, and corresponding to an event in the computing environment;
detecting an event record of a first type;
detecting an event record of a second type;
determining that the event record of the second type occurring after the event record of the first type;
parsing the event record of the first type to detect a resource identifier, wherein the resource identifier corresponds to a resource deployed in the computing environment;
initiating inspection of the resource for a cybersecurity object only in response to detecting that the event record of the second type occurred after the event record of the first type; and
initiating a mitigation action in the computing environment, in response to detecting the cybersecurity object on the resource.

9. A system for near-real time inspection of a computing environment for a cybersecurity object comprising:
a processing circuitry;
a memory, the memory containing instructions that, when executed by the processing circuitry, configure the system to:
continuously receive from a first source a first plurality of event records, each event record having an event type, and corresponding to an event in the computing environment;
periodically receive from a second source a second plurality of event records, each event record having an event type, and corresponding to an event in the computing environment;
detect an event record of a first type;
detect an event record of a second type;
determine that the event record of the second type occurring after the event record of the first type;
parse the event record of the first type to detect a resource identifier, wherein the resource identifier corresponds to a resource deployed in the computing environment;
initiate inspection of the resource for a cybersecurity object only in response to detecting that the event record of the second type occurred after the event record of the first type; and
initiate a mitigation action in the computing environment, in response to detecting the cybersecurity object on the resource.

10. The system of claim 9, wherein the memory contains further instructions which when executed by the processing circuitry further configure the system to:
periodically inspect each resource of a plurality of resources deployed in the computing environment for the cybersecurity object, based on a list of resource identifiers.

11. The system of claim 10, wherein the memory contains further instructions which when executed by the processing circuitry further configure the system to:
determine that the resource corresponding to the resource identifier was not inspected in a previous inspection period.

12. The system of claim 11, wherein the memory contains further instructions which when executed by the processing circuitry further configure the system to:
initiate inspection of the resource further based on a determination that the resource was not previously inspected.

13. The system of claim 10, wherein the memory contains further instructions which when executed by the processing circuitry further configure the system to:
add the resource identifier to the list of resource identifiers.

14. The system of claim 9, wherein the memory contains further instructions which when executed by the processing circuitry further configure the system to:
initiate inspection of a second resource in response to detecting the cybersecurity object on the resource, wherein the event record of the first type includes an identifier of the second resource.

15. The system of claim 9, wherein the memory contains further instructions which when executed by the processing circuitry further configure the system to:
initiate inspection of the resource for a second cybersecurity object; and
determine that the resource includes a cybersecurity risk, based on detecting the cybersecurity object and the second cybersecurity object.

* * * * *